United States Patent
Clarke et al.

(10) Patent No.: US 8,533,280 B1
(45) Date of Patent: Sep. 10, 2013

(54) DISTRIBUTED ORIGIN CONTENT DELIVERY NETWORK

(75) Inventors: Donald Peregrine Clarke, Gilroy, CA (US); Edward Deitz Crump, Santa Cruz, CA (US); Barrett Gibson Lyon, Pacifica, CA (US)

(73) Assignees: BitGravity, Inc., Herndon, VA (US); Juniper Networks, Inc., Sunnyvale, CA (US)

( * ) Notice: Subject to any disclaimer, the term of this patent is extended or adjusted under 35 U.S.C. 154(b) by 55 days.

(21) Appl. No.: 12/151,133

(22) Filed: May 2, 2008

(51) Int. Cl.
G06F 15/16 (2006.01)

(52) U.S. Cl.
USPC .............. 709/207; 709/223; 709/224

(58) Field of Classification Search
USPC .......................... 709/207, 223–224
See application file for complete search history.

(56) References Cited

U.S. PATENT DOCUMENTS

| | | | | |
|---|---|---|---|---|
| 6,125,369 A * | 9/2000 | Wu et al. | | 707/613 |
| 6,327,252 B1 * | 12/2001 | Silton et al. | | 370/256 |
| 6,925,504 B1 * | 8/2005 | Liskov et al. | | 709/239 |
| 7,136,903 B1 * | 11/2006 | Phillips et al. | | 709/217 |
| 7,155,436 B2 * | 12/2006 | Hegde et al. | | 1/1 |
| 7,181,523 B2 * | 2/2007 | Sim | | 709/226 |
| 7,185,052 B2 * | 2/2007 | Day | | 709/203 |
| 7,222,185 B1 * | 5/2007 | Day | | 709/232 |
| 7,689,510 B2 * | 3/2010 | Lamkin et al. | | 705/51 |
| 7,768,913 B1 * | 8/2010 | Shepherd et al. | | 370/230 |
| 7,818,355 B2 | 10/2010 | Mills et al. | | |
| 2004/0193576 A1 * | 9/2004 | Petculescu et al. | | 707/3 |
| 2005/0038820 A1 * | 2/2005 | Sakashita et al. | | 707/104.1 |
| 2006/0112137 A1 * | 5/2006 | Petculescu et al. | | 707/103 R |
| 2006/0212596 A1 * | 9/2006 | O'Neal et al. | | 709/233 |
| 2006/0221866 A1 * | 10/2006 | Shepherd | | 370/255 |
| 2007/0014277 A1 * | 1/2007 | Ebbesen et al. | | 370/351 |
| 2007/0016650 A1 * | 1/2007 | Gilbert et al. | | 709/207 |
| 2007/0028000 A1 * | 2/2007 | Ebbesen et al. | | 709/238 |
| 2007/0162945 A1 | 7/2007 | Mills | | |
| 2007/0233736 A1 * | 10/2007 | Xiong et al. | | 707/104.1 |
| 2007/0233884 A1 * | 10/2007 | Farber et al. | | 709/229 |
| 2007/0288986 A1 * | 12/2007 | Candelore et al. | | 725/132 |
| 2008/0005086 A1 * | 1/2008 | Moore | | 707/3 |
| 2008/0005358 A1 * | 1/2008 | Kwon et al. | | 709/248 |
| 2008/0091845 A1 | 4/2008 | Mills et al. | | |
| 2008/0140800 A1 * | 6/2008 | Farber et al. | | 709/214 |
| 2008/0140976 A1 * | 6/2008 | Holt | | 711/168 |
| 2008/0235200 A1 | 9/2008 | Washington et al. | | |
| 2009/0007198 A1 * | 1/2009 | Lavender et al. | | 725/91 |
| 2009/0013414 A1 | 1/2009 | Washington et al. | | |

* cited by examiner

*Primary Examiner* — Waseem Ashraf
(74) *Attorney, Agent, or Firm* — Westerman, Hattori, Daniels & Adrian, LLP

(57) ABSTRACT

Updating a node of a content delivery network is disclosed. In some embodiments, an indication of an event associated with a piece of content, which event is associated with a change in a corpus of content associated with a content delivery network, is received at a node of the content delivery network; and in response to the received indication, an action is performed at the node, if applicable, such that at least a portion of the corpus of content associated with the content delivery network stored at the node is updated based on the event.

23 Claims, 3 Drawing Sheets

DISTRIBUTED ORIGIN CONTENT DELIVERY NETWORK

BACKGROUND OF THE INVENTION

Traditional content delivery networks, e.g., caching proxy networks, often introduce significant latency when servicing requests. For example, a content request received by a proxy caching server is served if the content is cached at that server. However, if the content is not cached at that server, the request is handed off to other nodes and/or to the origin. This process may iterate until the content is located, leading to long delays due to recursive lookups. Thus, an improved content delivery network architecture is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content delivery network (CDN) comprises a lattice of nodes networked together that cooperate to deliver content to end users. A distributed origin CDN is disclosed herein. As described, a distributed origin CDN stores the corpus of content associated with the CDN at each of at least a subset of nodes comprising the CDN. Hence each of the at least subset of nodes mimics an origin in a distributed origin CDN, allowing efficient delivery of content to end users.

Figure 1A:
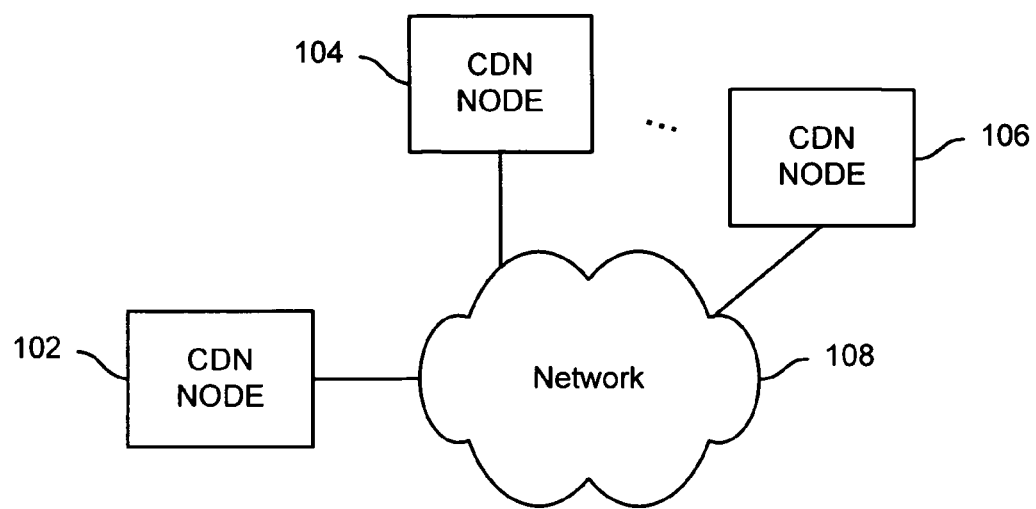
FIG. 1A illustrates an embodiment of nodes of a CDN.

FIG. 1A illustrates an embodiment of nodes of a CDN. Although in the given example, three nodes—node 102, node 104, and node 106—of a CDN are depicted, a CDN may have any number of nodes and any appropriate network topology. The nodes communicate via a network 108 such as the Internet. New content may be uploaded and/or existing content may be changed, e.g., by an end user, with respect to one or more of the nodes. As sometimes used herein, "master node" refers to the node at which an event originally occurs with respect to a piece of content. In some embodiments, when an event occurs with respect to a piece of content at a master node that changes the piece of content (and/or the corpus of content associated with the content delivery network), notifications of the event are propagated through the network to the other nodes so that appropriate actions can be taken at the others nodes based on the event so that the nodes can be updated. Such a CDN comprises a push architecture by which changes or at least notifications of changes at any given node are pushed out to remote nodes so that the nodes can be kept synchronized and up-to-date. In some embodiments, a node includes a notifier module to generate notifications of events. In some of the examples described herein, files are used to represent content although in various embodiments content may comprise any appropriate data structure.

Figure 1B:
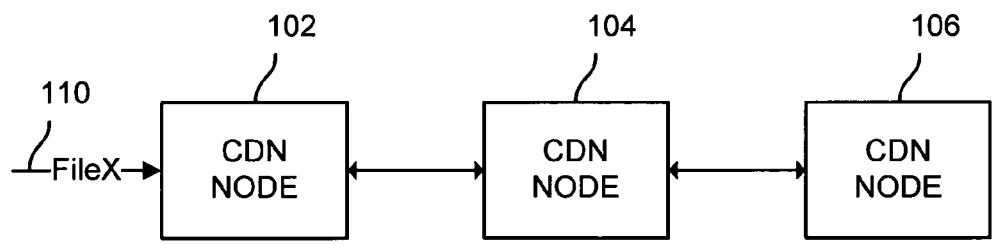
FIG. 1B illustrates an embodiment of nodes of a CDN.

FIG. 1B illustrates an embodiment in which a new file is uploaded to a node of a CDN and the corresponding population at the other nodes of that file. As depicted, FileX 110 is uploaded to node 102, e.g., by an end user using an appropriate file transfer protocol such as FTP. In some embodiments, once the file is uploaded to node 102, a notification to add FileX is sent from node 102 to node 104. In some embodiments, the add notification received at node 104 is input into an add queue at node 104 that includes notifications of content to be added at node 104 that are received from other nodes. In various embodiments, one or more add notifications in an add queue at a node may be processed serially and/or in parallel. In response to the add notification from node 102, node 104 requests and receives FileX from node 102. In the given example, node 106 is assumed to be geographically closer in location to node 104 than node 102. In some such cases, for example, it may be more efficient to conduct data transfers between node 106 and node 104 since the latency between node 106 and node 104 may be less than that between node 106 and node 102. In some embodiments, once node 104 has obtained FileX from node 102, a notification to add FileX is sent from node 104 to node 106. In some embodiments, the add notification received at node 106 is input into an add queue at node 106. In response to the add notification from node 104, node 106 requests and receives FileX from node 104. The process described with respect to FIG. 1B may be iterated until all (or at least a subset of nodes) of a CDN are populated with the file.

A cascading architecture for replicating content is described with respect to FIG. 1B. In such a cascading architecture, for example, replication may be performed between nodes that are separated by a prescribed distance (e.g., number of hops) in the network topology so that content can be efficiently replicated across the nodes of the CDN. For example, in FIG. 1B, replication is performed between nodes that are separated by one hop. That is, replication of FileX is conducted between master node 102 and node 104 since node 104 is one hop away from master node 102, and replication of FileX is conducted between node 104 and node 106 since node 106 is one hop away from node 104 (and two hops away from node 102). Alternatively, in some embodiments, replication may be performed with respect to the master node for at least a subset of nodes of the CDN, regardless of the distance between the nodes. In such a case, for example, replication may be conducted between master node 102 and node 104 as well as master node 102 and node 106.

The addition of new content (e.g., a file) at a node as described with respect to FIG. 1B is one type of event that may need to be communicated and/or replicated through the lattice of nodes that comprise a CDN. Other types of events that change the corpus of content associated with the content delivery network that may need to be replicated throughout the CDN include the deletion of an existing file, a change in an existing file, a renaming of an existing file, etc. In some embodiments, replication is performed on a global basis with respect to an entire file rather than individual pieces of a file. In the cascading architecture in the example of FIG. 1B, the notification to add FileX is not received at node 104 from node 102 until the file has been completely uploaded to node 102, and similarly the notification to add FileX is not received at node 106 from node 104 until the file exists at node 104 (i.e., until the file is received at node 104 from node 102). Thus, some latency may be introduced during the propagation of new content through the nodes of a CDN. An action in response to an event such as a delete, change, or rename, however, may be locally performed at a node without requiring a data transfer from another node. In some embodiments, a notification of some types of events (e.g., a delete, change, rename, etc.) may immediately be communicated from node-to-node as each node becomes aware of the event so that the nodes can be more quickly synchronized. With respect to FIG. 1B, for example, if instead of being added, FileX is deleted from master node 102, a notification to delete FileX may be communicated from node 102 to node 104; and upon receipt of the notification at node 104, the notification to delete FileX may immediately be forwarded to node 106. In some embodiments, a notification to add a file may also be similarly immediately forwarded as each node becomes aware of the add event, e.g., even if the file has not been yet acquired by the node. In some embodiments, a notification of each event type that is received at a node is added to a queue associated with that event type at the node that at least in part may control the order in which notifications are processed at the node.

Figure 2A:
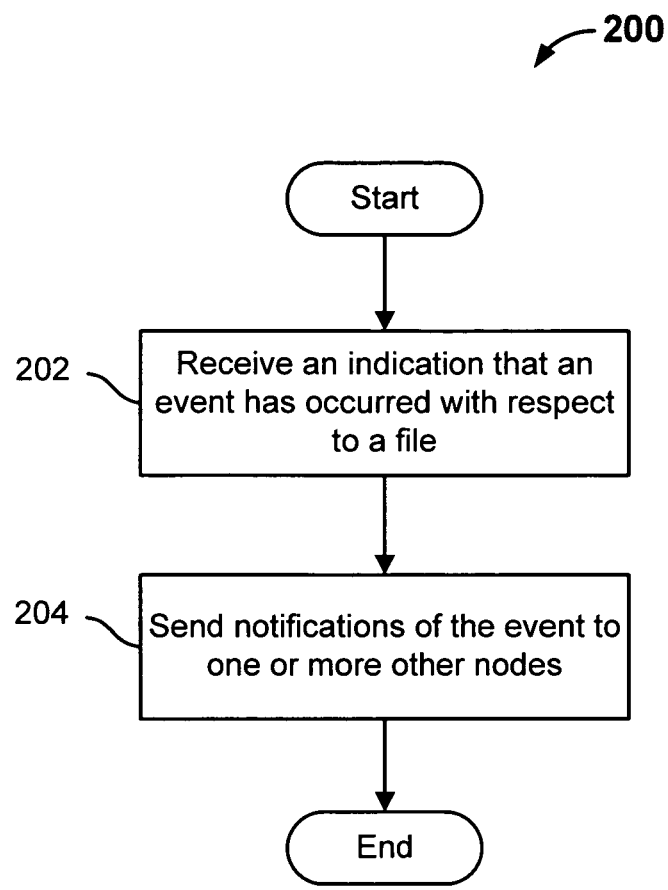
FIG. 2A illustrates an embodiment of a process for issuing notifications of an event from a node.

FIG. 2A illustrates an embodiment of a process for issuing notifications of an event from a node. In some embodiments, process 200 is performed with respect to a master node. For example, process 200 may be performed by a notifier module of a master node. Process 200 starts at 202 at which an indication that an event has occurred with respect to a file is received. For example, the event may comprise an add event, a delete event, a change event, a rename event, etc. At 204, notifications of the event are sent to one or more other nodes, and process 200 subsequently ends. For example, notifications may be sent to one or more other nodes that are a prescribed distance (e.g., number of hops) away. In some embodiments, notifications of an add event are sent to one or more other nodes after the associated file has finished uploading, i.e. being locally copied.

Figure 2B:
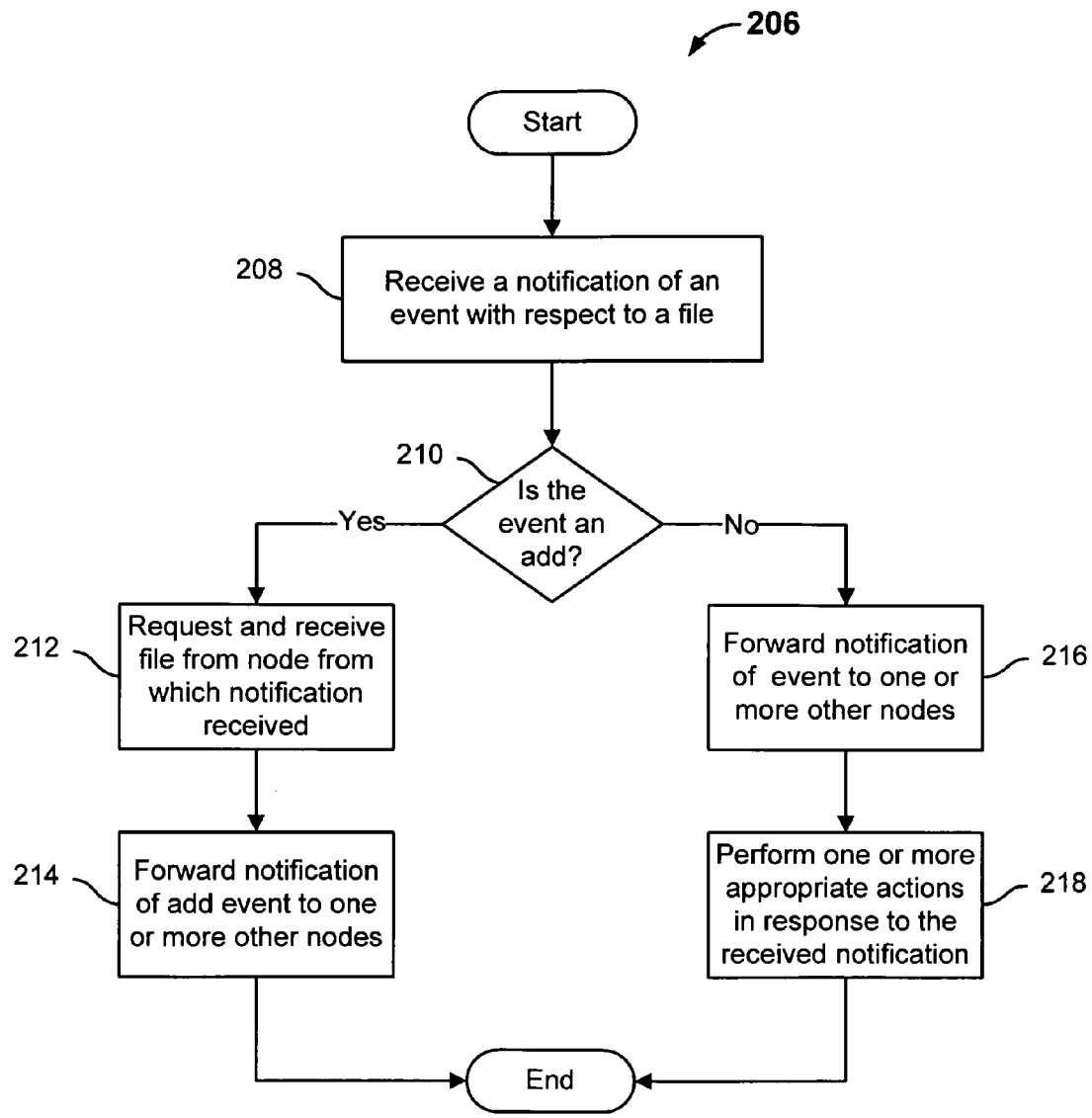
FIG. 2B illustrates an embodiment of a process for responding to a received notification at a node.

FIG. 2B illustrates an embodiment of a process for responding to a received notification at a node. In some embodiments, process 206 is performed with respect to a node that is not a master node. Process 206 starts at 208 at which a notification (or other indication) of an event with respect to a file is received from a node. For example, the notification may be received from a node that is a prescribed distance (e.g., number of hops) away. In some cases, the notification may be received from a master node at which the event originally occurred. In some cases, the notification may be received from a neighboring (e.g., upstream) node. At 210 it is determined whether the event comprises an add event. If it is determined at 210 that the event comprises an add event, the associated file is requested and received at 212 from the node from which the notification was received. In some embodiments, 212 includes adding the notification to an add queue and requesting the file when the notification is at the top of the queue. Once the file is locally available, the notification of the add event is forwarded at 214 to one or more other (e.g., neighboring) nodes that are a prescribed distance (e.g., number of hops) away, if any such nodes exist in the network topology, and process 206 subsequently ends. For example, the notification may be forwarded to one or more downstream nodes that are one hop away. If it is determined at 210 that the event does not comprise an add event, the notification of the event is forwarded at 216 to one or more other (e.g., neighboring nodes) that are a prescribed distance (e.g., number of hops) away, if any such nodes exist in the network topology. For example, the notification may be forwarded to one or more downstream nodes that are one hop away. At 218, one or more appropriate actions are performed in response to the received notification, and process 206 subsequently ends. For example, if the event comprises a delete event, the file is locally deleted at 218; if the event comprises a renaming event, the file is locally renamed at 218; if the event comprises a change event, the file is locally changed or updated at 218; etc. In some embodiments, 218 includes adding the notification to an associated queue and performing one or more appropriate actions when the notification is at the top of the queue. In some embodiments, a change event is handled in a manner similar to an add event (i.e., steps 212 and 214 of process 206). In some embodiments, an add event corresponding to adding a new version of a file may be divided into two events at a node: a delete event of a previous version of the file stored at the node and an add event for obtaining the new version of the file.

In some embodiments, a new event may cancel an in-progress event. For example, if an add event or a change event for a file is in progress at a node, a subsequent delete event for the file cancels the add event or change event. In some embodiments, a redundant event may at least temporarily be ignored and/or delayed. For example, if an add event or a change event for a file is in progress at a node, subsequent add or change events for the file will be ignored and/or delayed at least until the in-progress add or change event completes.

In a distributed origin CDN in which each node stores the corpus of content associated with the CDN, a request for content received at a node from an end user can in most cases be locally served, e.g., from a data center associated with the node. However, the requested content may not locally be available at the node if, for instance, an event associated with the requested content (e.g., a file upload) is in progress and/or replication of the event has not yet entirely propagated throughout the network. For example, with respect to FIG. 1B, an end user may request FileX from node 106 prior to node 106 even receiving a notification to add FileX. In various embodiments, any appropriate faulting techniques may be employed if requested content is not locally available at a node. In some embodiments, the end user may be redirected to the master node and/or to another node (e.g., a neighboring node) that has the requested content. In some embodiments, the requested content may be proxied from the master node and/or another node transparently to the end user. In the cases in which the proxy technique is employed, the received content is not only served to the requesting end user but also may be locally stored as it is received by the node at which it was requested by the end user. As an example of the proxy technique, consider that in FIG. 1B a request for FileX is received at node 106 but FileX has not finished uploading to node 102. Thus, FileX is not yet locally available at node 106. In this case, for instance, as portions of FileX are uploaded to node 102, they can be proxied to node 106 either directly from node 102 or via node 104. Thus, FileX can be served from node 106 to an end user without requiring the end user to redirect to master node 102. In some embodiments, FileX may also be locally stored at node 106 as it is received and/or node 104 if it is being proxied via node 104. Alternatively, in some embodiments, the proxy process operates at least in part independently of replication. In some such cases, for example, content received at node 104 and/or node 106 during the proxy process may not be locally stored at one or both of the nodes, and replication may be handled separately by replication processes such as those described with respect to FIGS. 2A and 2B.

In some embodiments, a proxy process may facilitate the identification of a missed file by a node. For example, with respect to FIG. 1B, consider that node 102 issued an add FileX notification to node 104, but node 104 failed to receive the notification, e.g., due to node 104 being offline or an internal failure at node 104 when the notification was sent. In such a case, FileX will not be added to node 104, and the notification will not be forwarded from node 104 to node 106. If FileX is requested at node 106, however, node 106 may redirect to and/or proxy from node 104, making node 104 aware of the missing file. Thus, even though a notification of an event may be missed by a node, the node is able to identify missing content and obtain the content so that the corpus of content associated with the CDN is locally available at the node.

In some embodiments, two or more nodes of a CDN may be associated with the same (i.e., anycast) IP address. In such cases, for example, an anycast request from an end user directed to the CDN and addressed to that IP address may be serviced by any of the nodes with that IP address, such as, for example, a nearest node to the end user. In some embodiments, each of a set of nodes that have the same IP address may also be associated with a unique (i.e., unicast) IP address that may be employed for communication between the nodes, e.g., during a replication process, redirection, a proxy process, etc. In some embodiments, all of the nodes of a CDN are associated with the same IP address. In such cases, for example, the CDN may appear to an end user to function similarly to a single massive web server that is accessible using that IP address.

In some embodiments, all of the nodes of a CDN are mirrors of each other and include (most of) the corpus of content associated with the CDN. In such cases, the CDN comprises a distributed or replicated file system. In some embodiments, a subset of nodes of a CDN include (most of) the corpus of content associated with the CDN. In some such cases, one or more of the nodes not included in the subset may comprise cache nodes. In such cases, content is cached as it is requested at each cache node, and new content is not actively requested by the cache nodes in response to add notifications. In some embodiments, each cache node still receives notifications of events associated with content and may perform appropriate actions if the corresponding content is currently cached. For example, if the file associated with a delete notification is cached, the file is deleted; if a file associated with a change notification is cached, the file is changed or updated as specified; if a file associated with a rename notification is cached, the file is renamed; etc. In some embodiments, no action is performed at a cache node in response to an add notification associated with new content. However, if an add notification is associated with content that is already cached, e.g., if the add notification is associated with a new version of a file a previous version of which is cached, the content is deleted from the cache since it is not the most recent version. In some embodiments, a change notification is handled similarly, i.e., if the content associated with a change notification is cached, it is deleted.

As described, a notification of any type of event that changes the corpus of content of a CDN is actively pushed to the nodes of the CDN, and appropriate actions are performed at each of the nodes, if applicable, so that the most up-to-date content is available at each node. Moreover, nodes of the CDN that include the corpus of content associated with the CDN are quickly updated and synchronized in response to changes in the corpus of content, resulting in a CDN that is not only reliable due to redundancy but very efficient in responding to requests for content.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for updating a plurality of nodes of a content delivery network, comprising:
    configuring a node of the plurality of nodes of the content delivery network that hosts a corpus of content to store the corpus of content;
    receiving, at the node of the plurality of nodes, a notification of an event associated with a piece of content at the node of the plurality of nodes, wherein the event is associated with a change in the corpus of content;
    transmitting, to at least one other node of the plurality of nodes, the notification of the event, wherein the at least one other node of the plurality of nodes is at least a predetermined number of hops away from the node of plurality of nodes;
    adding, at the at least one other node of the plurality of nodes, the notification of the event to a queue that at least in part may control the order in which notifications are processed at the at least one other node of the plurality of nodes;
    determining, at the at least one other node of the plurality of nodes, whether the notification is associated with a previously received notification of an in-progress event;
    performing, based at least in part on the determination, an action at the at least one other node of the plurality of nodes in response to the notification, if applicable, such that the corpus of content stored at the at least one node of the plurality of nodes is updated based on the event;
    cancelling the in-progress event at the at least one other node of the plurality of nodes which is associated with the previously received notification, when the notification contradicts the previously received notification; and
    continuing the in-progress event at the at least one other node of the plurality of nodes which is associated with the previously received notification, and delaying the event associated with the notification, when the notification does not contradict the previously received notification.

2. The method as recited in claim 1, wherein the notification is received from a node of the plurality of nodes at which the event originally occurred.

3. The method as recited in claim 1, wherein the notification is received from a neighboring node of the at least one other node of the plurality of nodes.

4. The method as recited in claim 1, wherein the event associated with a piece of content comprises an add event associated with a file.

5. The method as recited in claim 4, wherein the action comprises requesting and receiving the file from a node of the plurality of nodes from which the notification is received.

6. The method as recited in claim 4, wherein the notification is received in response to the file being uploaded to the node of the plurality of nodes.

7. The method as recited in claim 1, wherein the event associated with a piece of content comprises a delete event associated with a file.

8. The method as recited in claim 7, wherein the action comprises deleting the file at the at least one other node of the plurality of nodes.

9. The method as recited in claim 1, wherein the event associated with a piece of content comprises a change event associated with a file.

10. The method as recited in claim 9, wherein the action comprises changing the file as specified by the change event at the at least one other node of the plurality of nodes.

11. The method as recited in claim 1, wherein the event associated with a piece of content comprises a rename event associated with a file.

12. The method as recited in claim 11, wherein the action comprises renaming the file at the at least one other node of the plurality of nodes.

13. The method as recited in claim 1, wherein a subset of nodes of the plurality of nodes comprising the content delivery network each comprises a cache node.

14. The method as recited in claim 1, wherein at least notifications of changes in the corpus of content are pushed to the plurality of nodes comprising the content delivery network.

15. The method as recited in claim 1, wherein the piece of content is a first piece of content and further comprising receiving a request for a second piece of content at the node of the plurality of nodes.

16. The method as recited in claim 15, further comprising providing the second piece of content to the requestor if the second piece of content is locally available at the node of the plurality of nodes.

17. The method as recited in claim 15, further comprising redirecting the requestor to a different node of the plurality of nodes if the second piece of content is not yet available at the node of the plurality of nodes.

18. The method as recited in claim 15, further comprising proxying the second piece of content from another node of the plurality of nodes if the second piece of content is not yet available at the node of the plurality of nodes.

19. The method as recited in claim 15, wherein the second piece of content comprises the first piece of content.

20. A content delivery network, comprising:
a node and at least one other node;
the node of a content delivery network that hosts a corpus of content comprising:
a processor and a memory coupled to the processor configured to provide the processor with instructions to:
store the corpus of content,
receive a notification of an event associated with a piece of content, wherein the event is associated with a change in the corpus of content,
transmit, to the at least one other node of the content delivery network, the notification of the event, wherein the at least one other node is at least a predetermined number of hops away from the node;
the at least one other node comprising:
a processor and a memory coupled to the processor configured to provide the processor with instructions to:
add the notification of the event to a queue that at least in part may control the order in which notifications are processed at the at least one other node of the content delivery network,
determine whether the notification is associated with a previously received notification of an in-progress event,
perform based at least in part on the determination an action in response to the notification, if applicable, such that the corpus of content stored at the at least one other node is updated based on the event,
cancel the in-progress event at the at least one other node which is associated with the previously received notification, when the notification contradicts the previously received notification, and
continue the in-progress event at the at least one other node which is associated with the previously received notification, and delaying the event associated with the notification, when the notification does not contradict the previously received notification.

21. A computer program product for updating a plurality of nodes of a content delivery network, the computer program product being embodied in a non-transitory computer readable storage medium and comprising computer instructions for:
storing, at a node of the plurality of nodes, a corpus of content associated with the content delivery network;
receiving, at the node of the plurality of nodes, a notification of an event associated with a piece of content at the node of the plurality of nodes, wherein the event is associated with a change in the corpus of content;
transmitting, to at least one other node of the plurality of nodes, the notification of the event, wherein the at least one other node of the plurality of nodes is at least a predetermined number of hops away from the node of the plurality of nodes;
adding, at the at least one other node of the plurality of nodes, the notification of the event to a queue that at least in part may control the order in which notifications are processed at the at least one other node of the plurality of nodes;
determining, at the at least one other node of the plurality of nodes, whether the notification is associated with a previously received notification of an in-progress event; and
performing, based at least in part on the determination, an action at the at least one other node of the plurality of nodes in response to the notification, if applicable, such that the corpus of content stored at the at least one other node of the plurality of nodes is updated based on the event;
cancelling the in-progress event at the at least one other node of the plurality of nodes which is associated with the previously received notification, when the notification contradicts the previously received notification; and
continuing the in-progress event at the at least one other node of the plurality of nodes which is associated with the previously received notification, and delaying the event associated with the notification, when the notification does not contradict the previously received notification.

22. The method as recited in claim 1, wherein the in-progress event is an add event or a change event.

23. The method as recited in claim 1, wherein each node of the plurality of nodes of the content delivery network stores the corpus of content.

* * * * *